Patented Mar. 14, 1933

1,901,626

UNITED STATES PATENT OFFICE

JOSEPH N. BORGLIN, OF KENVIL, NEW JERSEY, ASSIGNOR TO HERCULES POWDER COMPANY, OF WILMINGTON, DELAWARE, A CORPORATION OF DELAWARE

METHOD OF REFINING ROSIN

No Drawing.   Application filed January 24, 1930.   Serial No. 423,273.

This invention relates to a method of refining rosin, as wood rosin and gum rosin, and more particularly relates to the removal or separation from rosin of color bodies.

As is well known, wood rosin, such as is extracted by means of a solvent from, for example, stump wood, and lower grades of gum rosin contain visible color bodies which darken the rosin and render it unfit for use when light colored products are desired. Further, wood rosin and, not infrequently, low grade gum rosin, contains invisible or latent color bodies, which, under certain conditions, as in the presence of an alkali and oxygen, tend to darken and become visible to the detriment of products of such rosin, as for example, soaps.

Now, it is the object of this invention to provide a method whereby visible and/or latent color bodies may be efficiently and economically removed from wood or gum rosin containing either or both types of color bodies, whereby high grade rosin of light color may be obtained from dark low grade rosin and whereby, at the same time, latent color bodies, normally present in wood rosin and where present in low grade gum rosin, will be removed or effectively reduced in amount so that the rosin may be used under conditions effective to cause such color bodies to darken.

In accordance with this invention, from the broad standpoint, I subject the rosin to be refined, in solution in a suitable solvent therefor, to treatment with resorcinol, in solution in a suitable solvent therefor. More particularly, I admix a solution of resorcinol in a suitable solvent with a solution of rosin in a suitable solvent and effect thorough contact of the two solutions, as by agitation of the mixture, or by effecting a more or less homogeneous solution of the two solvents, which may generally be effected by controlling the temperature of the mixture, or by refluxing the two solutions. When the two solutions have been thoroughly contacted, I separate them, which may be accomplished, for example, by permitting settlement, centrifugation, or otherwise, with suitable control of the temperature of the mixture when necessary or desirable. When the two solutions are separated, refined rosin is recovered from the rosin-solvent solution, for example, by evaporating off the solvent. Desirably the rosin solvent solution after separation will be washed one or more times with, for example, an aqueous alcohol, say 80% (by volume) alcohol, or other suitable solvent for resorcinol which may be effectually separated from the rosin solution, in order to effect the removal from the rosin of residual resorcinol.

In accordance with this invention the refining, or removal from the rosin of color bodies, is effected essentially by the resorcinol, which, highly dispersed in solution in a suitable solvent, acts to extract or selectively dissolve color bodies from the rosin, highly dispersed in solution in a suitable solvent, when the two solutions are admixed and contacted by agitation, or by the formation of a more or less homogeneous solution of the solvents. On separation of the two solutions, color bodies of the rosin will remain in solution in the resorcinol-solvent solution, while the refined rosin, or rosin from which the color bodies in solution in the resorcinol-solvent solution have been extracted, will be in solution in the solvent therefor and may be recovered by, for example, evaporating off the solvent.

In proceeding in accordance with this invention, the rosin, either wood or gum rosin, may be treated in solution in a suitable solvent therefor such, for example, as gasoline, petroleum ether, or other relatively light petroleum hydrocarbon, pinene, or other suitable terpene hydrocarbon, or the like, or the rosin may be treated as present in "drop liquor," i. e. the solution obtained by extracting with a solvent wood from which turpentine has been steam distilled. The treatment of the rosin may be effected with a solution of resorcinol in a suitable solvent such as an aliphatic alcohol, as for example, ethyl, methyl, butyl, propyl, or the like alcohols, in acetone, or mixtures thereof, or other suitable solvent. When an alcohol is used for forming the resorcinol solution it may be aqueous or anhydrous.

Aqueous alcohol will be found to be substantially immiscible with suitable rosin solvents at room temperature, or below, and anhydrous alcohol while normally miscible with suitable solvents for the rosin at room temperature, will, however, when containing resorcinol in solution be substantially immiscible therewith at room temperature, or below. Thus, the alcohol may be largely separated from rosin-solvent solution at room temperatures, and can be substantially completely separated therefrom when cooled. At the same time the alcohol with resorcinol in solution may be made to form a homogeneous solution with the rosin-solvent solution on heating.

When proceeding in accordance with this invention, while the rosin and resorcinol solutions may vary widely in their concentrations of rosin and resorcinol respectively, it is desirable, from the standpoint of greatest economy, that the rosin solution have a concentration within about the range 5%–20% rosin, and that the resorcinol solution have a concentration within about the range 10%–50% resorcinol.

As illustrative of the practical application of this invention, for example, a solution comprising 400 parts of a 12% solution of wood rosin in gasoline is admixed with a solution comprising 50 parts of resorcinol dissolved in 80 parts of, for example, anhydrous ethyl alcohol. The two solutions, which will settle or separate into the two layers at a temperature of say 20°C.–40° C., are then thoroughly contacted, for example, by agitation at room temperature, or, if desired, by heating to a temperature of say 55° C. at which they will form a homogeneous solution, or, if desired, by refluxing the mixed solutions, say at a temperature of about 50° C. When the two solutions have been thoroughly contacted, in order to enable the resorcinol to selectively dissolve color bodies contained in the rosin they are permitted to separate into two layers, after having been sufficiently cooled, if heat has been applied, and desirably in any event in order to facilitate and expedite their separation. Desirably the admixed solutions will be separated at a temperature of say, for example, −5° C. though it will be appreciated that the exact temperature of separation is immaterial. On separation, there will be obtained a solution of refined rosin in gasoline and a solution of resorcinol in ethyl alcohol, which will also contain, in solution, visible and latent color bodies extracted from the rosin. The refined rosin is recovered from the rosin-gasoline solution in any convenient manner, as by evaporating off the gasoline. However, before recovery of the refined rosin from the gasoline solution, that solution is desirably washed one or more times with aqueous alcohol, as for example, with 160 parts of 80% ethyl alcohol (by volume), which will remove therefrom any residual resorcinol. The aqueous alcohol may be largely, if not entirely, separated from the gasoline-rosin solution at room temperature due to the fact that in aqueous state, as compared with anhydrous, the alcohol will be substantially immiscible with the gasoline, or other suitable solvent for the rosin. Any of the alcohol remaining in the gasoline-rosin solution will be separated from the refined rosin when recovered by evaporation off the gasoline. In the example given, using wood rosin grading FF in color, about 23 parts of rosin grading I in color will be obtained.

As a further illustration, using the solutions described in the above example, with substitution of, for example, 92% ethyl alcohol for anhydrous ethyl alcohol, refluxing the solutions under atmospheric pressure at a temperature of about 85° C., effecting separation at about room temperature, say 25° C., washing the gasoline-rosin solution twice with say 160 parts of 80% ethyl alcohol and evaporating off the gasoline, about 30.5 parts of rosin grading I in color will be obtained.

In the practical adaptation of my invention, as illustrated, and it being appreciated that any suitable solvent may be used in place of an alcohol, the separated resorcinol-alcohol solution will contain, in addition to color bodies of the rosin, a certain amount of rosin which may be recovered therefrom as low grade rosin by evaporation off of the resorcinol-alcohol solution. Such low grade rosin may be largely refined by dissolving in a solvent therefor and treating the solution formed with resorcinol-alcohol solution.

The refined rosin obtained by the practice of my invention may be further treated or refined, if desired, as for example, by distillation. In the practical adaptation of this invention, as will be observed, the solvent for the rosin, alcohol and resorcinol used may be largely recovered for reuse by fractionation.

It will now be observed that in accordance with this invention the removal of visible and/or latent color bodies from rosin highly dispersed in a solvent therefor, is effected, primarily through the use of resorcinol highly dispersed in a suitable solvent, as an aliphatic alcohol, aqueous or anhydrous, acetone, or the like, which acts as a dispersant or carrier for the resorcinol and which may or may not act to some degree as a refining agent, which, when ordinarily miscible with the rosin solvent, as in the case of anhydrous alcohol is rendered substantially immiscible with the rosin solvent at room temperature by the presence of the resorcinol and which not only enables the resorcinol to be thoroughly contacted with the rosin in solution, but enables the resorcinol and extracted color bodies to be effectively and readily separated from the rosin solution.

It will be understood that I consider any solvent for rosin and any suitable solvent for the resorcinol which will operate in this process as do those specifically mentioned herein to be equivalents for those mentioned, it being noted that the primary purpose of the solvents is to provide a carrier for the rosin and resorcinol and to enable them to be intimately contacted and to enable the separation of the resorcinol and color bodies dissolved thereby from the rosin.

It will be understood that in connection with the practice of the method according to this invention, I contemplate proceeding with or without temperature control, as by the use of heat and/or cooling, as within the scope of the invention.

What I claim and desire to protect by Letters Patent is:

1. The method of refining rosin which includes treating rosin in solution in a solvent therefor with a solution of resorcinol in an aliphatic alcohol the rosin solvent being characterized by the fact that it is capable of immiscibility with the aliphatic alcohol, separating the rosin-solvent solution from the resorcinol-alcohol solution and recovering refined rosin from the rosin-solvent solution.

2. The method of refining rosin which includes treating rosin in solution in gasoline with a solution of resorcinol in an aliphatic alcohol, separating the rosin-gasoline solution from the resorcinol-alcohol solution and recovering refined rosin from the rosin-gasoline solution.

3. The method of refining rosin which includes treating rosin in solution in a solvent therefor with a solution of resorcinol in an anhydrous aliphatic alcohol the rosin solvent being characterized by the fact that it is capable of immiscibility with the aliphatic alcohol, separating the rosin-solvent solution from the resorcinol-alcohol solution and recovering refined rosin from the rosin-solvent solution.

4. The method of refining rosin which includes treating rosin in solution in a solvent therefor which is capable of immiscibility with ethyl alcohol with a solution of resorcinol in ethyl alcohol, separating the rosin-solvent solution from the resorcinol-alcohol solution and recovering refined rosin from the rosin-solvent solution.

5. The method of refining rosin which includes treating rosin in solution in a solvent therefor which is capable of immiscibility with ethyl alcohol with a solution of resorcinol in anhydrous ethyl alcohol, separating the rosin-solvent solution from the resorcinol-alcohol solution and recovering refined rosin from the rosin-solvent solution.

6. The method of refining rosin which includes treating rosin in solution in gasoline with a solution of resorcinol in ethyl alcohol, separating the rosin-gasoline solution from the resorcinol-alcohol solution and recovering refined rosin from the rosin-gasoline solution.

7. The method of refining rosin which includes heating rosin in solution in a suitable solvent therefor with a solution of resorcinol in an aliphatic alcohol which is capable of miscibility and immiscibility with the rosin solvent to effect miscibility of the two solutions, cooling the solution formed, separating the rosin-solvent solution from the resorcinol-alcohol solution and recovering refined rosin from the rosin-solvent solution.

8. The method of refining rosin which includes heating rosin in solution in a suitable solvent therefor with a solution of resorcinol in a suitable solvent therefore which is capable of immiscibility with the rosin solvent to effect miscibility of the two solutions, cooling the solution formed, separating the rosin-solvent solution from the resorcinol-solvent solution and recovering refined rosin from the rosin-solvent solution.

9. The method of refining rosin which includes refluxing rosin in solution in a suitable solvent therefor with a solution of resorcinol in an aliphatic alcohol the rosin solvent being characterized by the fact that it is capable of immiscibility with the aliphatic alcohol, separating the rosin-solvent solution from the resorcinol-alcohol solution and recovering refined rosin from the rosin-solvent solution.

10. The method of refining rosin which includes treating rosin in solution in a suitable solvent therefor with a solution of resorcinol in an aliphatic alcohol the rosin-solvent being characterized by the fact that it is capable of immiscibility with the aliphatic alcohol, separating the rosin-solvent solution from the resorcinol-alcohol solution, washing the rosin-solvent solution with alcohol and recovering refined rosin from the rosin-solvent solution.

11. The method of refining rosin which includes treating rosin in solution in a suitably solvent therefor with a solution of resorcinol in a suitable solvent therefor which is capable of immiscibility with the rosin solvent, separating the rosin-solvent solution from the resorcinol-solvent solution, washing the rosin-solvent solution with a suitable solvent for resorcinol and recovering refined rosin from the rosin-solvent solution.

12. The method of refining rosin which includes heating rosin in solution in a suitable solvent therefor with a solution of resorcinol in an aliphatic alcohol which is capable of miscibility and immiscibility with the rosin solvent to effect miscibility of the two solutions, cooling the solution formed, separating the rosin-solvent solution from the resorcinol-alcohol solution, washing the rosin-solvent solution with alcohol and recovering refined rosin from the rosin-solvent solution.

13. The method of refining rosin which includes treating rosin in solution in gasoline with a solution of resorcinol in ethyl alcohol, separating the rosin-gasoline solution from the resorcinol-alcohol solution, washing rosin-gasoline solution with aqueous ethyl alcohol and recovering refined rosin from the rosin-gasoline solution.

14. The method of refining rosin which includes treating rosin in solution in a solvent therefor with a solution of resorcinol in an organic solvent capable of immiscibility with the rosin solution, separating the rosin-solvent solution from the resorcinol-solvent solution and recovering refined rosin from the rosin-solvent solution.

15. The method of refining rosin which includes treating rosin in solution in gasoline with a solution of resorcinol in an organic solvent capable of immiscibility with gasoline, separating the rosin-gasoline solution from the resorcinol-solvent solution and recovering refined rosin from the rosin-gasoline solution.

16. The method of refining rosin which includes treating rosin in solution in a solvent therefor with a solution of resorcinol in a suitable solvent therefor which is capable of immiscibility with the rosin solvent, separating the rosin-solvent solution from the resorcinol-solvent solution and recovering refined rosin from the rosin-solvent solution.

17. The method of refining rosin which includes treating rosin in solution in a solvent therefor which is capable of immiscibility with acetone with a solution of resorcinol in acetone, separating the rosin-solvent solution from the resorcinol-acetone solution and recovering refined rosin from the rosin-solvent solution.

18. The method of refining rosin which includes treating rosin in solution in gasoline with a solution of resorcinol in acetone, separating the rosin-solvent solution from the resorcinol-acetone solution and recovering refined rosin from the rosin-gasoline solution.

19. The method of refining rosin which includes treating rosin in solution in a solvent therefor which is capable of immiscibility with acetone with a solution of resorcinol in acetone, heating the solutions to effect miscibility thereof, cooling the solution formed, separating the rosin-solvent solution from the resorcinol-acetone solution and recovering refined rosin from the rosin-solvent solution.

20. The method of refining rosin which includes treating rosin in solution in a solvent therefor which is capable of immiscibility with methanol with a solution of resorcinol in methanol, separating the rosin-solvent solution from the resorcinol-methanol solution and recovering refined rosin from the rosin-solvent solution.

21. The method of refining rosin which includes treating rosin in solution in gasoline with a solution of resorcinol in methanol, separating the rosin-solvent solution from the resorcinol-methanol solution and recovering refined rosin from the rosin-gasoline solution.

22. The method of refining rosin which includes treating rosin in solution in a solvent therefor which is capable of immiscibility with methanol with a solution of resorcinol in methanol, heating the solutions to effect miscibility thereof, cooling the solution formed, separating the rosin-solvent solution from the resorcinol-methanol solution and recovering refined rosin from the rosin-solvent solution.

In testimony of which invention, I have hereunto set my hand, at Kenvil, N. J., on this 21st day of January, 1930.

JOSEPH N. BORGLIN.